United States Patent
Muller et al.

[11] Patent Number: 5,831,798
[45] Date of Patent: Nov. 3, 1998

[54] MAGNETIC HEAD CONFIGURED TO READ AND/OR WRITE INFORMATION ON DIGITAL AND ANALOG FORM

[75] Inventors: Johannes C.A. Muller; Abraham Hoogendoorn, both of Eindhoven, Netherlands

[73] Assignee: U.S. Philips Corporation, New York, N.Y.

[21] Appl. No.: 811,089

[22] Filed: Mar. 3, 1997

Related U.S. Application Data

[63] Continuation of Ser. No. 333,119, Nov. 1, 1994, abandoned, which is a continuation of Ser. No. 919,507, Jul. 24, 1992, abandoned, which is a continuation of Ser. No. 795,280, Nov. 19, 1991, abandoned, which is a continuation of Ser. No. 473,085, Jan. 30, 1990, abandoned.

[30] Foreign Application Priority Data

Jan. 30, 1989 [NL] Netherlands .......................... 8900214
Jul. 5, 1989 [NL] Netherlands .......................... 8901712

[51] Int. Cl.$^6$ ..................................................... G11B 5/29
[52] U.S. Cl. ............................................................ 360/121
[58] Field of Search ............................... 360/94, 96.1, 93, 360/90, 88, 27, 39, 55, 121, 106, 8; 381/34

[56] References Cited

U.S. PATENT DOCUMENTS

| | | | |
|---|---|---|---|
| 3,685,031 | 8/1972 | Cook | 360/32 |
| 3,913,135 | 10/1975 | Damlamian | 360/79 |
| 3,919,697 | 11/1975 | Walker | 360/77.12 |
| 3,949,175 | 4/1976 | Tanizoe et al. | 381/34 |
| 3,975,773 | 8/1976 | Dejouhanet et al. | 360/121 |
| 4,179,719 | 12/1979 | Imamura et al. | 360/125 |
| 4,237,505 | 12/1980 | Yamada et al. | 360/121 |
| 4,291,354 | 9/1981 | Chase | 360/121 |
| 4,365,115 | 12/1982 | Nagata et al. | 381/34 |
| 4,373,173 | 2/1983 | Robinson et al. | 360/121 |
| 4,388,660 | 6/1983 | Osani | 360/121 |
| 4,445,150 | 4/1984 | Nakajima et al. | 360/27 |
| 4,510,543 | 4/1985 | Ohta et al. | 360/106 |
| 4,536,804 | 8/1985 | Kasubuchi et al. | 360/4 |
| 4,623,941 | 11/1986 | Juso et al. | 360/8 |
| 4,685,005 | 8/1987 | Fields, Jr. | 360/121 |
| 4,691,253 | 9/1987 | Silver | 360/35.1 |
| 4,730,222 | 3/1988 | Schauffele | 360/33.1 |
| 4,775,901 | 10/1988 | Nakano | 360/60 |
| 4,853,798 | 8/1989 | Fukuju et al. | 360/47 |
| 4,896,224 | 1/1990 | Tobe et al. | 360/19.1 |
| 4,967,289 | 10/1990 | Kanota et al. | 360/46 |
| 5,313,342 | 5/1994 | Soda et al. | 360/121 |

FOREIGN PATENT DOCUMENTS 0430265 6/1991 European Pat. Off. .

OTHER PUBLICATIONS

Sakamoto et al., "On High–Density Recording of the Compact–Cassette Digital Recorder", J. Audio Eng. Soc., vol. 32, No. 9, Sep. 1984, pp. 640–646.

"How Pasc Data Compression Works in Philips Digital Compact Cassette" Audio Sep. 1991, pp. 32–39 Audio.

*Primary Examiner*—Craig A. Renner
*Attorney, Agent, or Firm*—John C. Fox

[57] ABSTRACT

A magnetic tape apparatus intended for consumer use includes at least one digital head with nine digital transmission gaps for reading and/or writing compressed digital information in longitudinal tracks on a magnetic tape. The apparatus also includes electronic circuitry for compressing the digital information prior to writing, and for expanding the digital information after reading. This arrangement enables at least playback of digital audio information at the same frequency used for analog compact cassettes, so that inclusion of an analog head enables playback of analog compact cassettes as well.

1 Claim, 5 Drawing Sheets

MAGNETIC HEAD CONFIGURED TO READ AND/OR WRITE INFORMATION ON DIGITAL AND ANALOG FORM

This is a continuation of application Ser. No. 08/333,119, filed on Nov. 1, 1994, now abandoned, which is a continuation of 07/919,507, filed on Jul. 24, 1992, now abandoned, which is a continuation of 07/795,280, filed Nov. 19, 1991, now abandoned, which is a continuation of 07/473,085, filed Jan. 30, 1990, now abandoned.

BACKGROUND OF THE INVENTION

The invention relates to a longitudinal magnetic tape recording apparatus, which apparatus comprises magnetic-head means including at least one magnetic-head for reading and/or writing information on magnetic tape in a cassette, and tape-transport means for the transport of the magnetic tape past the magnetic-head means.

The cassette comprises a housing having two substantially parallel main walls and a plurality of transverse walls, and accommodating the magnetic tape, which extends between two reels across an opening formed in one of the transverse walls of the housing. The apparatus is constructed to cooperate with the cassette in first and second positions of the cassette, the second position being rotated through 180° relative to the first position about an axis which extends parallel to the main walls and perpendicular to the opening transversed by the tape.

Such a system is generally known in the form of the standard Compact Cassette system, in which apparatus for reading and/or writing information, generally in the form of music, in analog form in longitudinal tracks on a magnetic tape in a cassette. In this system, the cassette is reversible, so that after recording and/or reproduction of the information on/from a first (A) track, the cassette an be reversed and continued on a second (B) track without prior rewinding of the tape or replacement of the cassette. This standard system is defined in IEC publication 94.

A disadvantage of this system is that the signal-to-noise ratio and the quality of the recorded signal itself are noticeably degraded in comparison with the original source signal.

The music quality is inferior to that of the Compact Disc system, even in the case of the best equipment and magnetic-tape cassettes of the Compact Cassette system. In order to upgrade the quality, the prior art system has been improved in many respects, such as for example by the use of automatic azimuth control and a variety of noise reduction systems. These improvements make the equipment far more expensive and, in spite of this, a quality comparable to that of the Compact Disc cannot be attained. As a result, high-quality apparatus of the Compact Cassette system are far more expensive than simple Compact Disc apparatus, although their quality is distinctly inferior.

However, a huge number of Compact Cassettes and associated recorders are in use in the market. It is estimated that there are approximately one billion recorders and that the number of cassettes is a multiple thereof.

A system having quality similar to that of the Compact Disc system is for example the R-DAT (Rotary Head Digital Audio Tape) system. A disadvantage of this system is that it requires an entirely new magnetic tape cassette and magnetic tape apparatus with helical-scan recording heads. This results in more expensive cassettes and cassette decks. Moreover, the multitude of Compact Cassettes which are in use cannot be employed in conjunction with this system. This incompatibility means that the market is difficult to penetrate because it means a larger expenditure for the consumer and huge and insecure investments for the manufactures of hardware and software.

SUMMARY OF THE INVENTION

It is an object of the invention to provide a magnetic tape recording system in which the signal-to-noise ratio and the signal itself are improved considerably with a minimal adaptation of the system, enabling a gradual market penetration to be achieved.

To this end, the invention is characterized by a recording apparatus which is constructed to cooperate with a standard compact cassette and which comprises magnetic-head means constructed to read and/or write information in digital form in longitudinal tracks on the magnetic tape. By recording and reading the information in digital form, the tape noise has no influence on the recorded signal and, moreover, this provides an extended frequency range, so that the recorded signal itself is also improved. In addition to its compatibility with the current Compact Cassettes, the apparatus need not differ much from the prior recording apparatus, apart from the digital magnetic head means and some additional electronics. This enables a considerably improved new system with minimum adaptations of the prior-art system.

In one embodiment of the invention, the magnetic head means additionally includes means to at least read information in analog form from the magnetic tape. Thus, the apparatus is compatible with the prior art system at least in respect of the reproduction of information recorded on the magnetic tape in analog form. Therefore, prerecorded analog cassettes can always be played back on the apparatus so that it is no longer necessary for the consumer with a collection of such cassettes to have an apparatus of the prior type in addition to the apparatus of the invention.

In a further embodiment of the invention, the digital magnetic-head comprises a plurality of at least substantially parallel transmission gaps which are disposed substantially in line with one another in the head face, the gaps being spaced from one another in such a way that in the case of mirror-imaging relative to a central line of the head face perpendicular to the line of transmission gaps, a mirror image of a transmission gap is formed at least substantially between two adjacent transmission gaps. The inter-gap distances are then such that during manufacture hardly any problems will occur, and the heads can be manufactured with simple technologies, for example by the method described in U.S. Pat. No. 3,593,414, incorporated herein by reference. If there is some overlap between the transmission gaps and the mirror images this need not present any problem. In fact, this overlap means that during operation in the opposite direction of tape transport, the transmission gap also partly overlaps the track written during operation in the other direction of tape transport. During reading this will not give rise to any significant problem, while during recording a part of the track already recorded will be overwritten.

In another embodiment of the invention, the digital magnetic head comprises a plurality of at least substantially parallel transmission gaps formed in the head face substantially in line with one another, wholly at one side of the central line perpendicular to the line of transmission gaps, which gaps form at least one pattern for reading and/or writing information on the magnetic tape in one direction of tape transport. An advantage of this arrangement is that an analog track can be read with a plurality of gaps, so that signal losses are smaller than in the case of reading by means of only one gap. A further advantage is that the other side of the head face can be used for an analog gap pattern.

In a further embodiment of the invention, the digital magnetic head includes a further pattern of transmission gaps for reading and/or writing information on the magnetic tape in another direction of tape transport opposite to the one direction of tape transport. An advantage of this is that the magnetic head need not be reversed or set to another position when an auto-reverse system is used.

In still another embodiment of the invention, in which one side of the digital magnetic head comprises a plurality of parallel analog transmission gaps in line with one another, which gaps form at least one pattern for reading and/or writing information in an analog form on the magnetic tape in one direction of tape transport, when the digital side of the head face is projected onto the analog side of the head face, at least a projection of a digital transmission gap is obtained on every analog transmission gap. This enables information recorded on a magnetic tape in analog form by an analog magnetic head to be read with a digital magnetic head.

In still another embodiment of the invention, the apparatus comprises means for compressing and/or expanding information in digital form. The information in digital form should be expanded or compressed in order to enable the information to be reproduced from or recorded in a reduced number of tracks on the magnetic tape for a given speed of tape transport and write frequency. This data compression and expansion is also of significance for the digital magnetic head, because the number of gaps of the magnetic head is equal to the number of tracks to be recorded or read. The number of tracks is limited in view of the problems encountered in the manufacture of magnetic heads. In the absence of compression (data reduction) approximately 20 tracks (transmission gaps) would be needed to record the information at the customary recording frequency. The amount to be written per unit of time can be reduced by the use of data compression, so that a substantially smaller number of tracks (transmission gaps) can be used at the same recording frequency.

In a further embodiment, the apparatus is able to record information in digital form on a magnetic tape in a number of tracks and encoded in such a way that the information in digital form can be read with the same tape-transport speed as is customarily used for reading information in analog form from the Compact Cassette, in order that only one transport speed is required.

In yet a further embodiment of the invention, the pattern of transmission gaps of the digital magnetic head has nine gaps, of which one gap constitutes an auxiliary gap for reading and/or writing auxiliary information and the other eight gaps form main gaps for reading and/or writing the main (e.g., music) information. When eight gaps are used the amount of compressed information is found to be adequate, so that after expansion during reproduction, hardly any differences can be detected in comparison with the original signal. Moreover, the auxiliary gap enables, for example, information relating to the residual time available on and the elapsed time of the tape, and/or data relating to the main information on the tape, to be read and/or recorded.

In a still further embodiment of such a magnetic tape apparatus, the magnetic head means comprises a magnetic head constructed to read information in both analog form and digital form, and which magnetic head means further comprises a magnetic head for recording information at least in digital form. The use of a separate read head and a separate write head has the advantage that the heads can be manufactured more simply.

In a still further embodiment of the magnetic tape apparatus in accordance with the invention, magnetic head means comprises a magnetic head constructed to both read and write information in digital form and at least to read information in analog form. This has the advantage that no alignment of the read and write gaps relative to each other is needed. Another advantage is that the contact area between the magnetic head and the magnetic tape can be smaller, so that an effective tape-head contact can be achieved more simply.

In yet a further embodiment of the magnetic tape apparatus in accordance with the invention, the magnetic head, which is constructed to at least read information in both analog form and digital form, comprises a plurality of parallel transmission gaps disposed in line with each other in the head face, which gaps are arranged in two sub-patterns, the first sub-pattern corresponding to a pattern of transmission gaps for at least reading information in digital form on the magnetic tape in one direction of tape transport, and the second sub-pattern corresponding to a pattern of transmission gaps for at least reading information in analog form on the magnetic tape in one direction of tape transport. This magnetic head has the advantage that the analog signal on the magnetic tape can be read with less losses than in the case of magnetic heads which read the analog signal by means of one of the gaps of the gap pattern for reading and/or writing information in digital form, because the transmission gaps for reading information in analog form have substantially the same width as the analog information tracks on the magnetic tape while the transmission gaps for reading digital information are much narrower.

In another embodiment of the magnetic tape apparatus in accordance with the invention, at least one magnetic head is rotatable through at least substantially 180° about an axis perpendicular to the head face. This enables auto-reverse operation to be achieved, in the same way as in the prior-art apparatus, as described for example in U.S. Pat. No. 4,926,278, incorporated herein by reference.

In another embodiment of the magnetic-tape apparatus in accordance with the invention, at least one magnetic head is movable in a direction at least substantially parallel to the line of the transmission gaps, over a distance which is at least substantially equal to half the distance between the centers of two adjacent transmission gaps. This is an advantage in the case in which the distance between the transmission gaps of the magnetic head is at least equal to the width of a transmission gap. A small displacement is adequate to reach the intermediate tracks. For auto-reverse operation the magnetic head need not be rotated.

The invention also relates to a magnetic head for use in a magnetic-tape apparatus in accordance with the invention.

In one embodiment of such a magnetic head, there are eleven parallel transmission gaps of different dimensions, which gaps are disposed in line with one another in the head face, which head face is bisected by a central line perpendicular to this line. Nine of said transmission gaps are configured to read and/or write information in digital form, and two of said transmission gaps are configured to at least read information in analog form. The nine digital transmission gaps are provided in one half of the bisected head face, the transmission gap which is furthest from the central line being configured to read and/or write auxiliary information, and the two analog transmission gaps are provided in the other half of the head face. This enables information in both digital form and in analog form to be read.

The two analog transmission gaps have the same dimensions as the transmission gaps of the well-known magnetic heads as used in the standard Compact Cassette system. This enables information in analog form recorded on a magnetic tape in accordance with the Compact Cassette system to be read in an optimum manner.

For reading and writing main information in digital form, eight digital transmission gaps are provided. This enables operation at the desired tape-transport speed and data coding.

A further transmission gap for reading and/or writing auxiliary information may be provided in the analog half of the head face, in order to insert auxiliary information during analog recording in accordance with the Compact Cassette standard. Both during reading information in analog form and during reading or writing information in digital form, auto-reverse operation is possible by turning the magnetic head through 180°.

In order that the magnetic head need not be moved for auto-reverse operation, a further embodiment of the magnetic head comprises two groups of parallel transmission gaps which are disposed in line with each other in a head face which is bisected by a central line perpendicular to the transmission gaps, which groups each comprise two subgroups, being a first subgroup having transmission gaps in one half of the head face, for reading and/or writing information in digital form and a second subgroup having transmission gaps in the other half of the head face for at least reading information in analog form, a first subgroup of one of the groups and a second subgroup of the other group of transmission gaps being provided in each half of the head face.

BRIEF DESCRIPTION OF THE DRAWING

Embodiments of the invention will now be described in more detail, by way of example, with reference to the accompanying drawings. In the drawings.

DETAILED DESCRIPTION OF THE PREFERRED EMBODIMENTS

Figure 1:
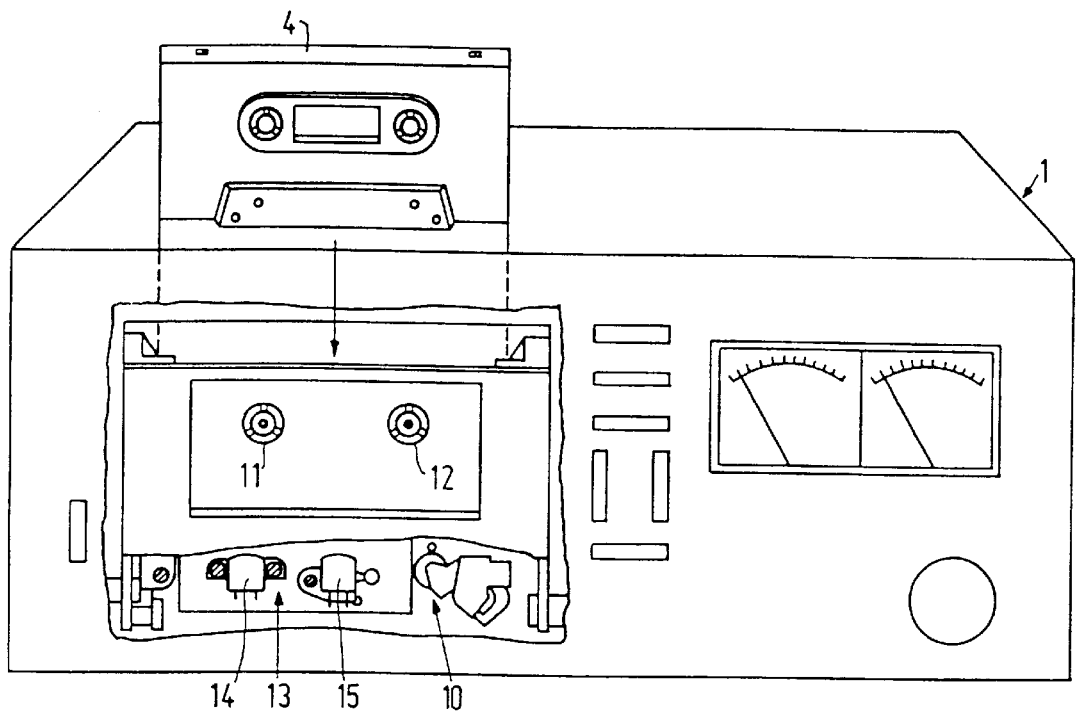
FIG. 1 shows a magnetic-tape recording/reproducing apparatus of the known type.
Figure 2:
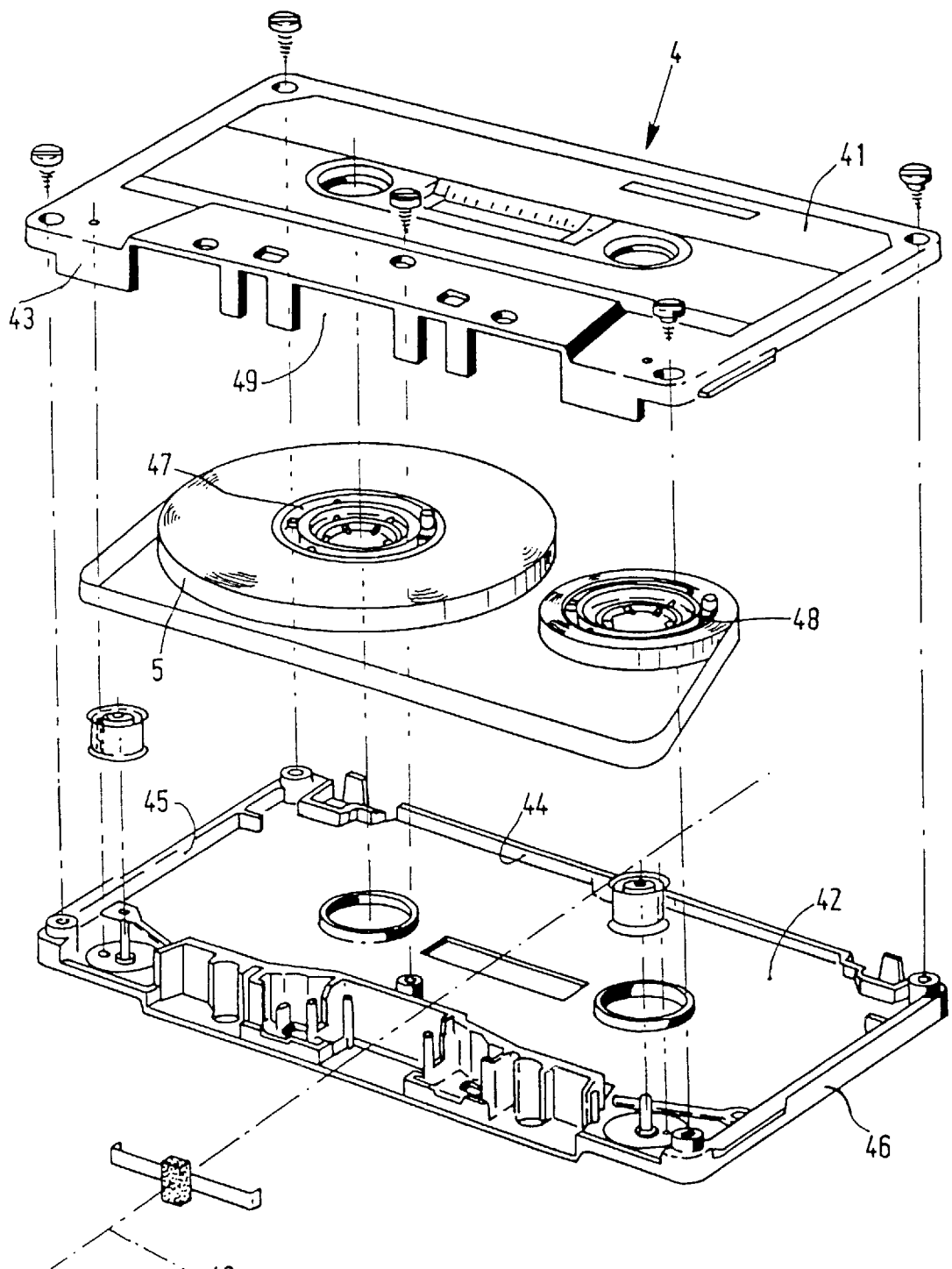
FIG. 2 shows a compact cassette of the known type.

An embodiment of a system in accordance with the prior art shown in FIG. 1, comprises a magnetic-tape apparatus and a cassette in the form of a well-known audio cassette 4 (a "Compact Cassette" as standardized in IEC publication no. 94-7), also shown in FIG. 2.

The magnetic-tape apparatus 1 of the known type shown in FIG. 1 is constructed to read and/or write information in analog form on a magnetic tape accommodated in the cassette 4. For this purpose, the apparatus 1 has tape-transport means, comprising a capstan/pressure roller combination 10, drive spindles 11 and 12, and magnetic head means 13, in the present embodiment represented as an erase head 14 and a magnetic head 15 of the known type for reading and/or writing information in analog form. Since this apparatus is a cassette recorder of a generally known type, for the sake of brevity no further details will be given.

FIG. 2 shows the cassette 4 in greater detail. The cassette comprises a housing having two main walls 41 and 42 and four transverse walls 43, 44, 45 and 46. The housing accommodates the magnetic tape 5, which is wound on reels 47 and 48 and which extends partly across an opening 49 formed in the transverse wall 43. The cassette 4 is constructed to cooperate with the apparatus 1 in a first position as shown in FIG. 1 and in a second position obtained by turning the cassette 4 through 180° about an axis of rotation 40 shown in FIG. 2.

Figure 3:
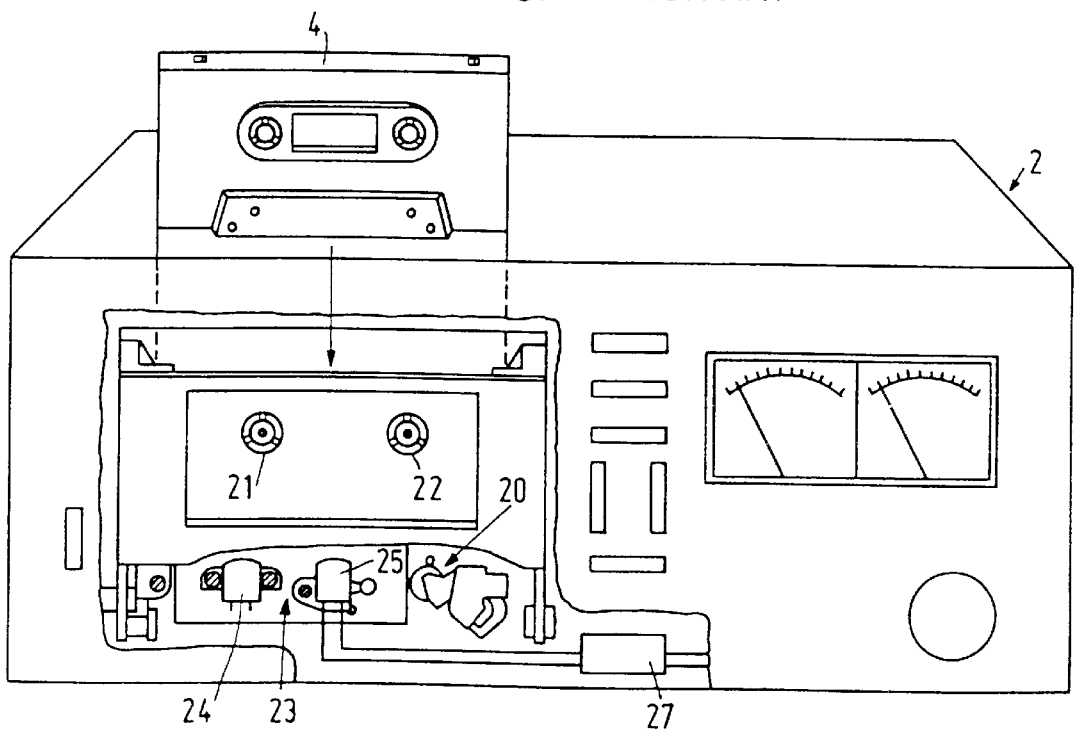
FIG. 3 shows an embodiment of a magnetic tape apparatus of the invention.

The magnetic tape apparatus 2 of the invention shown in FIG. 3 is also constructed to cooperate with the cassette 4. This apparatus 2 comprises a capstan/pressure roller combination 20 and drive spindles 21 and 22. The magnetic head means 23 comprise an erase head 24 and a magnetic head 25. The magnetic head 25 is constructed to read and write information in digital form and to read information in analog form. For reading and writing information in digital form, the apparatus 2 further comprises electronic compression and expansion means 27. These means are needed to write the information in digital form on the magnetic tape or to read said information from the magnetic tape in a limited number of information tracks with the same tape-transport speed as in the apparatus 1 of the known type.

Figure 4:
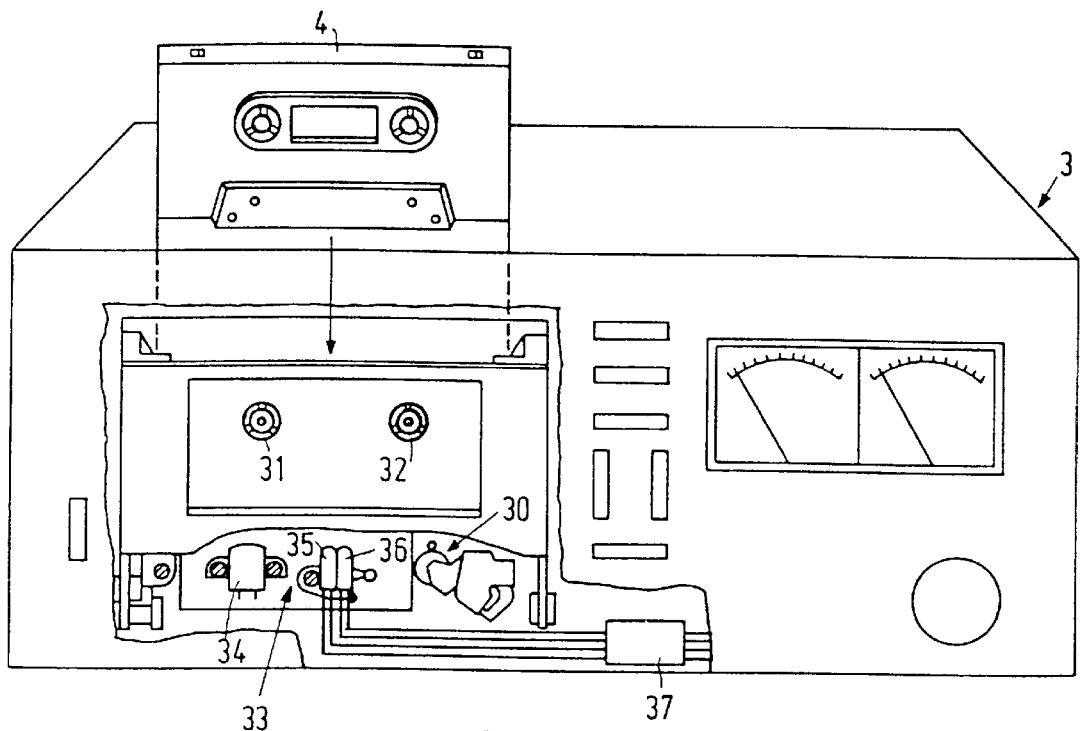
FIG. 4 shows another embodiment of a magnetic tape apparatus of the invention.

FIG. 4 shows another embodiment of the apparatus 3 of the second type. This apparatus also comprises a capstan/pressure roller combination 30, drive spindles 31 and 32, compression and expansion means 37, and magnetic-head means 33. The magnetic-head means 33 comprise an erase head 34 and two additional magnetic heads, i.e. a magnetic head 35 for reading information in analog or in digital form, and a magnetic head 36 for recording information in digital form.

The differences between apparatuses 2 and 3 shown in FIGS. 3 and 4, and the apparatus 1 of the known type mainly reside in different magnetic-head means 23, 33 and the presence of compression and expansion means 27, 37 (such as digital electronic circuits and the necessary analog/digital and digital/analog converters).

Figure 5:
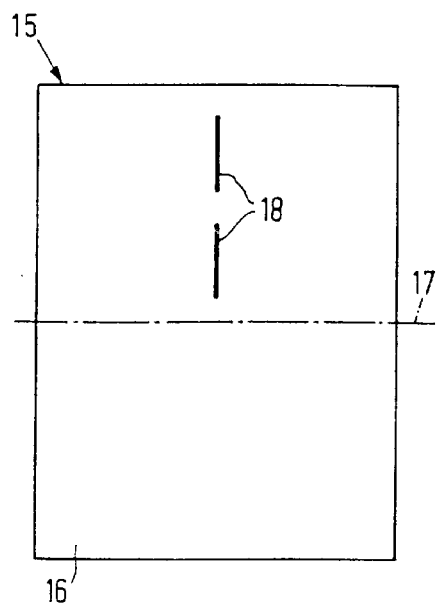
FIG. 5 shows an embodiment of a magnetic head of the known type.

FIG. 5 shows a prior-art magnetic head 15 of the analog type, which has two transmission gaps 18 disposed in one half of the head face 16 which is bisected by a central line 17. This magnetic head 15 is configured to read and write information in analog form.

FIGS. 6, 7, 8a and 8b show embodiments of magnetic heads 25, 28 and 29 of the invention, which are constructed for use in the apparatus 2 shown in FIG. 3. In the magnetic head 25 shown in FIG. 6, the transmission gaps 62 and 63 are also disposed in one half of a head face 60 which is bisected by a central line 61. In the magnetic head 28 shown in FIG. 7, the transmission gaps 72 and 73 are divided over the entire width of the head face 70 in such a way that in the case of mirror-imaging relative to the central line 71, the mirror images 74 of the transmission gaps 72, 73 will be situated between the transmission gaps 72, 73 themselves without any overlap, see FIG. 7a.

Figure 6:
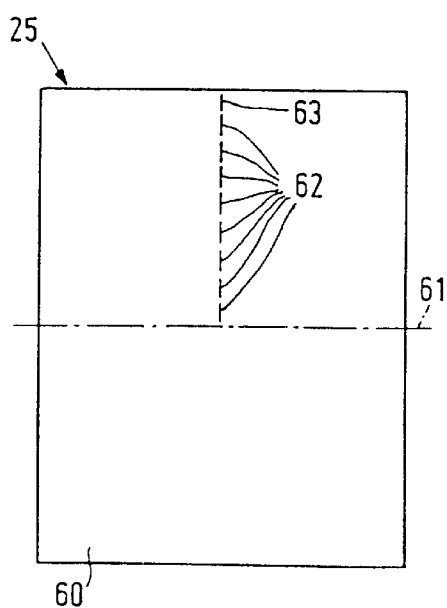
FIG. 6 shows a first embodiment of a magnetic head of the invention.
Figure 8A:
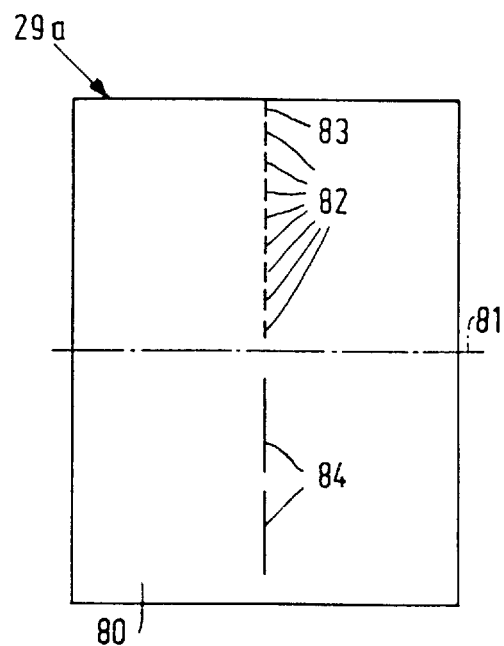
FIG. 8a shows a third embodiment of a magnetic head of the invention.

In the embodiment of FIG. 8a the magnetic head 29a has the track pattern of transmission gaps as shown in FIG. 6, and in addition has a further track pattern comprising two transmission gaps 84 for reading information in analog form. This magnetic head 29a may be constructed from two halves, bisected by a central line 81. The compound magnetic head 29a can be obtained by combining one half of the magnetic head 25 shown in FIG. 6 having transmission gaps 82 and 83 with one half 80 of the prior-art magnetic head 15 shown in FIG. 5. Alternatively, the magnetic head 29a can be constructed as an integral unit by integrating the transmission gaps 82, 83 and 84 in one head.

Figure 8B:
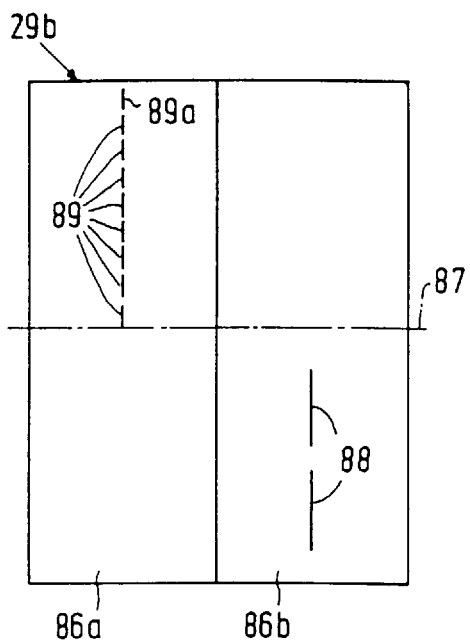
FIG. 8b shows another embodiment of the magnetic head shown in FIG. 8a, FIG. 9 shows two magnetic heads of the invention constructed for use in the apparatus shown in FIG. 4.

FIG. 8b shows another modification of a compound magnetic head 29b. In this modification, the prior-art magnetic head 15 shown in FIG. 5 and the magnetic head 25 shown in FIG. 6 are juxtaposed. This construction can be manufactured more simply than that shown in FIG. 8a. The magnetic head 29b has two head faces 86a and 86b. In one half (situated at one side of the central line 87) of the head face 86a, are main gaps 89 and an auxiliary gap 89a for digitally reading and writing information. In the other half (at the other side of the central line 87) of the head face 86b, are the transmission gaps 88 for at least reading analog information. The auxiliary transmission gaps 63, 73, 83 and 89a are constructed to read and write auxiliary information. This auxiliary information may include for example data on the main information recorded on the tape or data on the position of the head relative to the beginning or end of the tape. The main transmission gaps 62, 72, 82 and 89 are configured to read and write information in digital form.

In addition, the gaps 62 and 72 are configured to read information in analog form. When the head face 70 of the magnetic head 28 is projected onto the head face 16 of the magnetic head 15 of the first type at least one projection 100 of a transmission gap of the magnetic head 28 is situated on every transmission gap 18 of the magnetic head 15, see FIG. 7b. Preferably, a projection 100 of a transmission gap of the magnetic head 28 is situated on the center of each transmission gap 18 of the magnetic head 15, as is illustrated in FIG. 7b.

Figure 7:
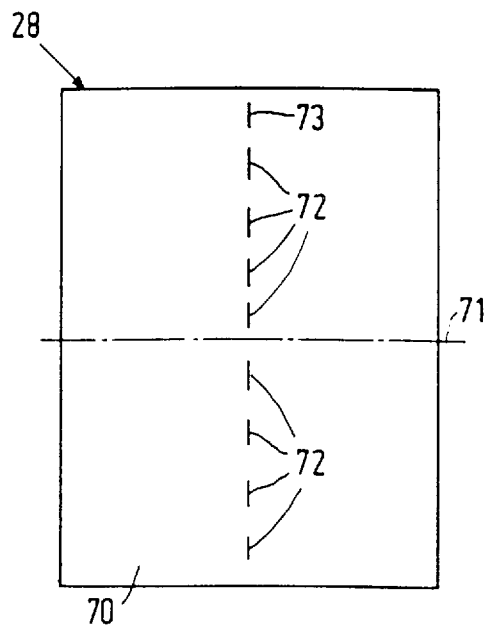
FIG. 7 shows a second embodiment of a magnetic head of the invention.
Figure 7A:
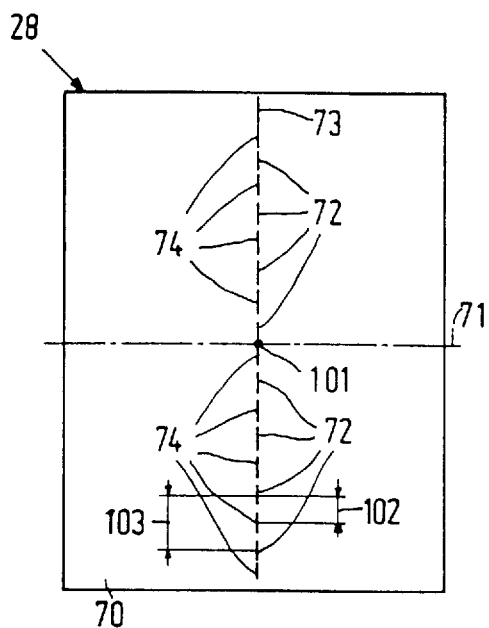
FIG. 7a shows how the transmission gaps and their mirror images are disposed in the case of a mirror-imaging relative to the central line of the magnetic head of FIG. 7.
Figure 7B:
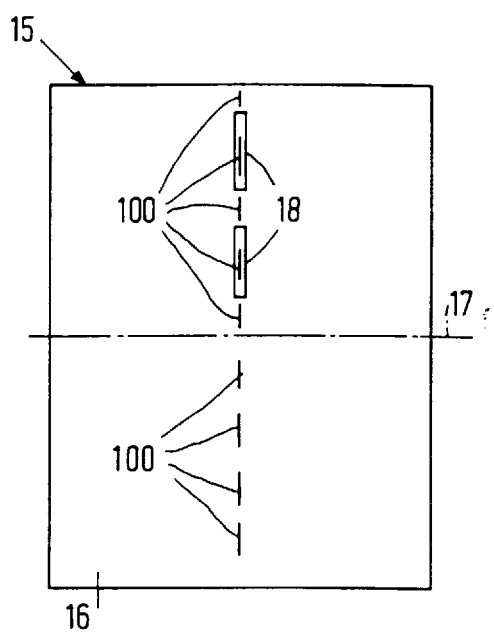
FIG. 7b shows the projection of the transmission gaps of the magnetic head of FIG. 7 on the transmission gaps of the magnetic head of FIG. 5.

For auto-reverse operation, the magnetic heads 25, 28 and 29 can be rotated through 180° about the axis 101 to cooperate with the track pattern of the information on the magnetic tape for the purpose of reading and/or writing in the reverse direction of the tape transport, see FIG. 7a. The magnetic head 28 shown in FIG. 7 can be moved over a distance 102 for the purpose of auto-reverse operation, see FIG. 7a. This distance 102 should be substantially equal to half the distance 103 between the centers of two adjacent transmission gaps 72.

Figure 9:
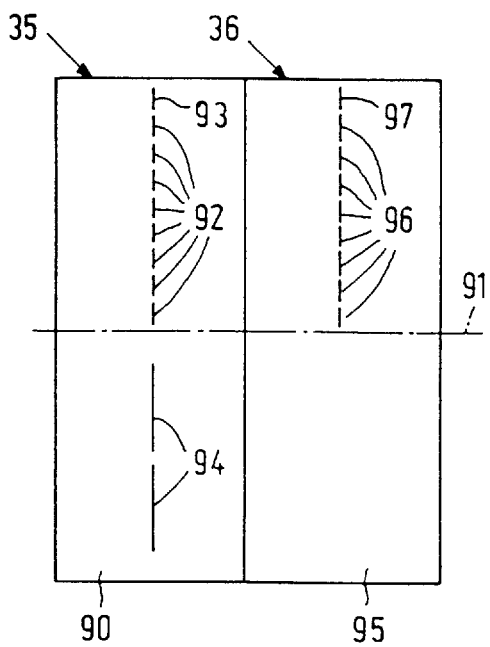

FIG. 9 shows a combination of two magnetic heads 35 and 36 suitable for use in the apparatus shown in FIG. 4. The magnetic head 35 is configured both to read information in digital form by means of the transmission gaps 92 and 93 and to read information in analog form by means of the transmission gaps 94. The magnetic head 36 is constructed to write information in digital form by means of the gaps 96 and 97. The gaps 93 and 97 constitute the auxiliary transmission gaps and the gaps 92 and 96 constitute the main transmission gaps. The eight main transmission gaps 92, 96 and one auxiliary transmission gap 93, 97 are situated in one half of the head face 90 which is bisected by the central line 91 and the transmission gaps 94 for reading the information in analog form are situated in the other half.

Figure 10:
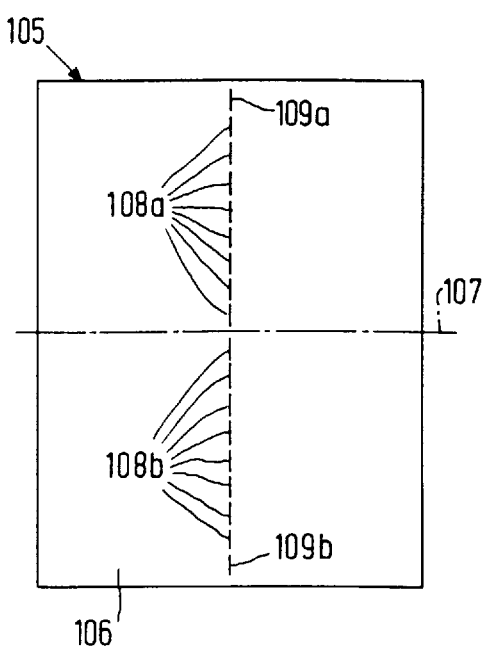
FIG. 10 shows a further embodiment of a magnetic head of the invention provided with two patterns of transmission gaps.

FIG. 10 shows a magnetic head 105, which is formed with two patterns of transmission gaps. One pattern comprising the auxiliary transmission gap 109a and the main transmission gaps 108a, is adapted to cooperate with the magnetic tape in one direction of tape transport. The other pattern, comprising the auxiliary transmission gap 109b and the main transmission gaps 108b, is adapted to cooperate with the magnetic tape in another direction of tape transport, opposite to the said one direction of tape transport. As a result, it is not necessary to rotate or to displace the head in the case of auto-reverse operation. The operation of the magnetic head can be adapted to tape transport in the opposite direction by deactivating the operative pattern and by activating the other pattern.

The associated gaps of a pattern of the magnetic head 105 shown in FIG. 10 are all situated in one half of the head face 106, which is bisected by the central axis 107. Obviously it is also possible to juxtapose one gap of a pattern and a gap of the other pattern in order to obtain a magnetic head having two interdigitated gap patterns.

Figure 11:
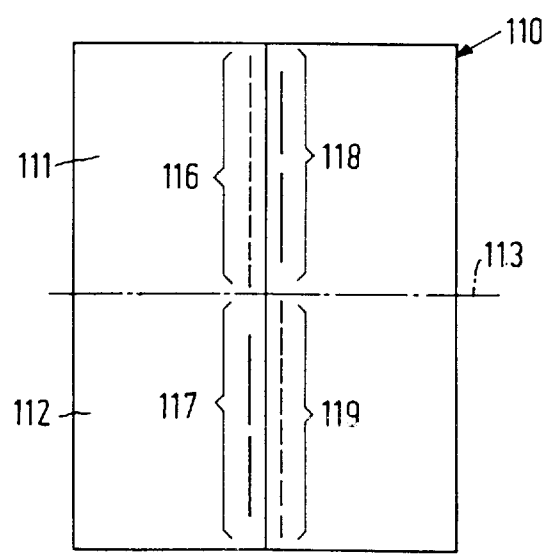
FIG. 11 shows yet another magnetic head of the type having two groups of patterns of transmission gaps.

FIG. 11 shows a magnetic head 110 which is very suitable for auto-reverse operation, because the magnetic head need not be rotated or moved for this purpose. A central line 113 bisects the head face into two halves 111 and 112. Each half is provided with a first subgroup, 117 and 118 respectively, of transmission gaps for at least reading information in analog form and with a second subgroup, 116 and 119 respectively, for reading or writing information in digital form.

A number of embodiments have been described above with reference to diagrammatic Figures merely by way of illustration. However, the invention is not limited to the embodiments described herein, numerous other embodiments which utilize the inventive principles in a way other than described, being possible within the scope of the invention as defined in the appended claims. Thus, a known system for a longitudinal analog recording is extended to obtain digital longitudinal recording by the addition of digital recorders. Moreover, such a system provides substantial advantages if use is made of the inventive principle of constructing digital recorders in such a way that they are compatible with the original analog recording system, at least in so far as they are adapted to at least play back cassettes with an analog recording.

For example, in addition to the embodiments described herein, other embodiments of the invention are possible in which the apparatuses are constructed only for the reproduction of digital and analog signals, for example car cassette players or portable cassette players, or in which the apparatuses are capable both of analog and digital reading and recording. Moreover, it is possible to dispense with the erase head by appropriately guiding and positioning the tape relative to the magnetic head, whereby the tracks already present can be overwritten almost completely with tracks containing new information.

We claim:

1. A magnetic head for use in a magnetic tape apparatus for reading and/or writing information in digital form in longitudinal tracks on a magnetic tape, the head comprising a first plurality of transmission gaps which are disposed substantially in line with one another in a head face, which first plurality of gaps form at least one digital pattern for reading and/or writing information in digital form on the magnetic tape, the head also comprising a second plurality of transmission gaps which are disposed substantially in line with one another in the head face, which second plurality of gaps form at least one analog pattern for at least reading information in analog form from the magnetic tape, the gaps of the first plurality each having a gap width smaller than a gap width of each of the gaps of the second plurality, the head face bisected into two halves by a central line perpendicular to the line of transmission gaps formed by the first plurality of transmission gaps, the first plurality of gaps consisting of nine gaps disposed in line with one another and provided in one half of the head face, the gap which is remotest from the central line being configured to read and/or write auxiliary information in digital form, and the second plurality of gaps consisting of two gaps disposed in line with one another and with the first plurality of gaps, and provided in the other half of the head face, whereby the magnetic head has a total of eleven which eleven gaps are disposed in line with one another in the head face.

\* \* \* \* \*